Oct. 31, 1961     G. S. WHITE     3,007,015
MONITORING EQUIPMENT
Filed July 25, 1956     4 Sheets-Sheet 1
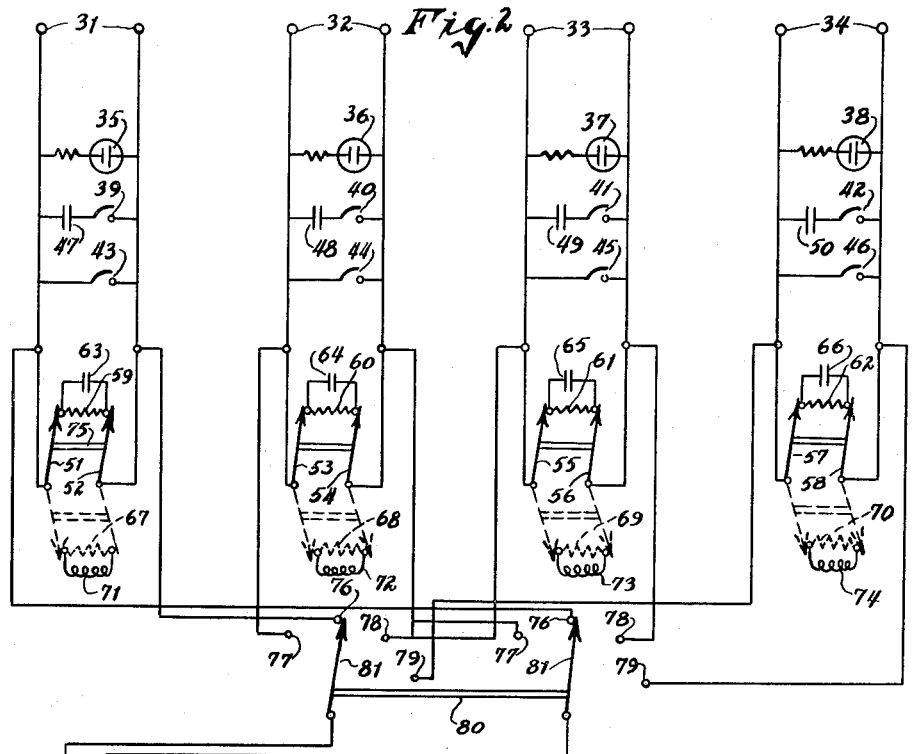
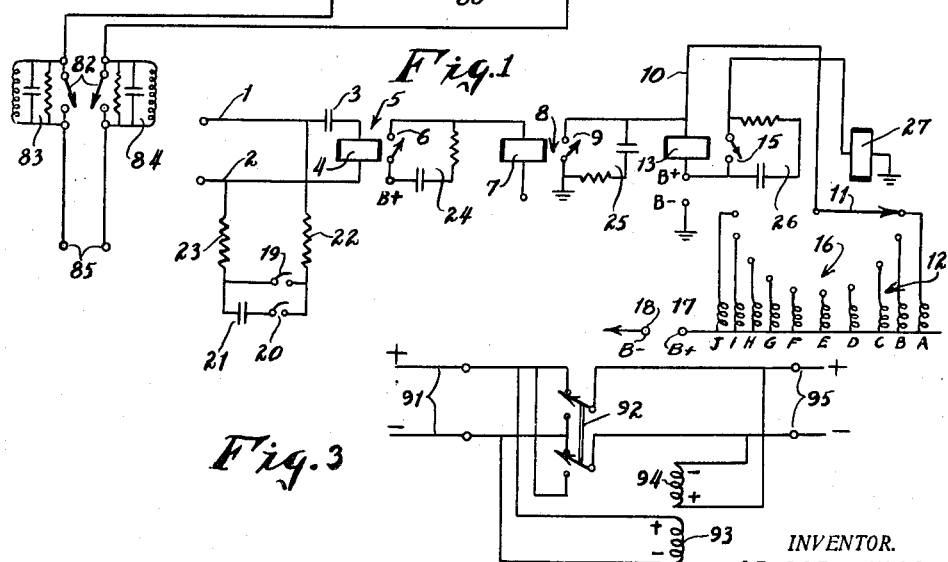
INVENTOR.
GEORGE WHITE
BY
ATTORNEY

INVENTOR.
GEORGE WHITE
BY
ATTORNEY

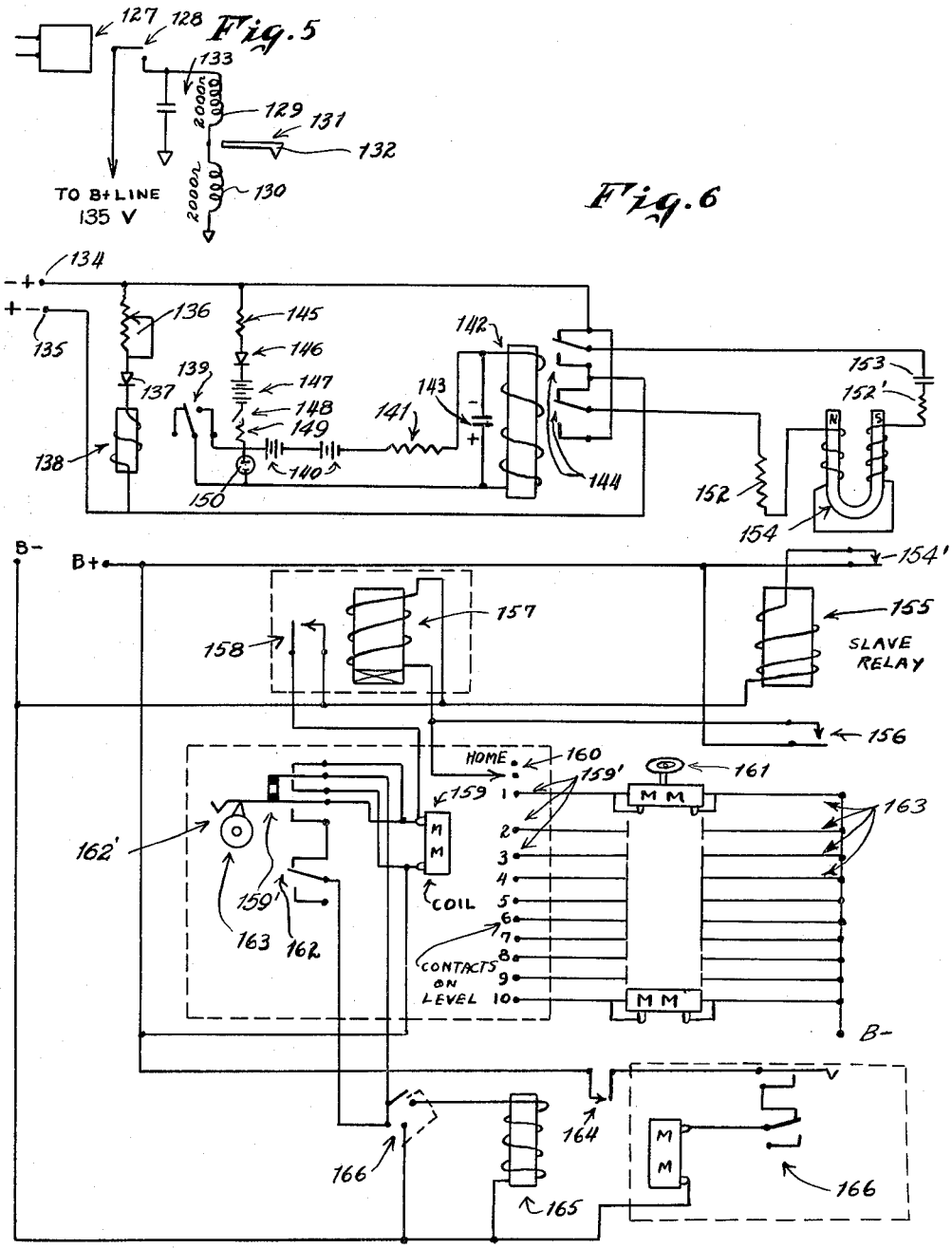

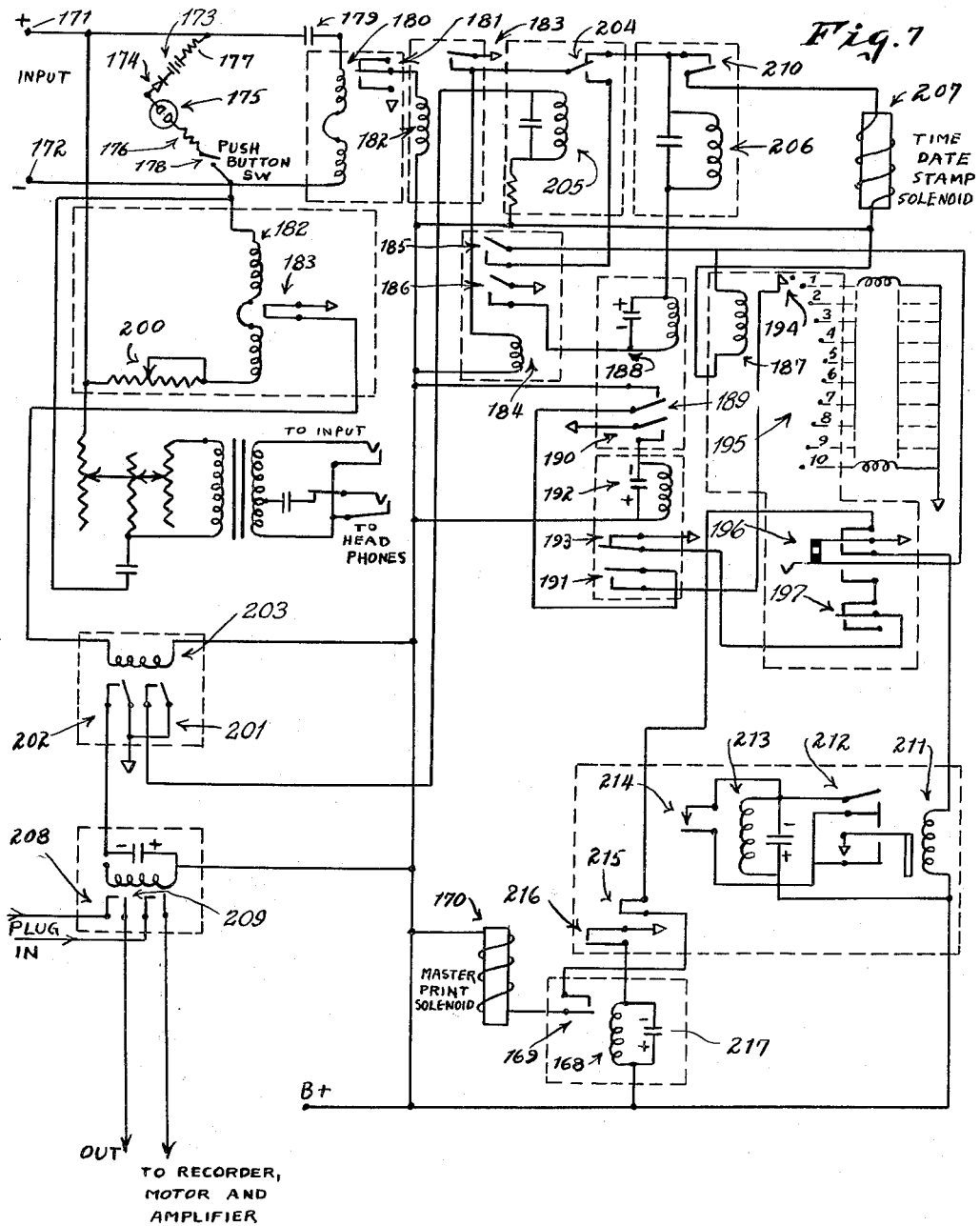

3,007,015
MONITORING EQUIPMENT
George S. White, 453 Mount Prospect Ave., Newark, N.J.
Filed July 25, 1956, Ser. No. 600,145
3 Claims. (Cl. 179—175.2)

This invention relates to monitoring devices and more specifically to the scientific investigation of electrical signal transmission such as waves of any type especially in the form of sound or pulses which are to be observed or recorded.

A specific use of this equipment is where evidence or proof is to be introduced in an action legal or administrative by city, county, state or government.

One of the objects of this invention is to connect the monitoring equipment proper such as a telephone, counter, or recorder with one or more lines to be monitored in such a manner as to reduce the connecting noise or click to a minimum, i.e. below audibility for the subscriber.

Another object of the invention is to reduce discharge of the line caused by the monitoring device to a minimum, or at least to start it at a minimum, with a subsequent increase occuring only gradually.

A further object of the invention is, at the time of connection, to cause a gradual or slow discharge fadeout of the line current, thus obliging at least one of the conversing parties to repeat at least part of its message.

Still another object of the invention is to permit of monitoring several lines practically simultaneously.

A more specific object of the invention is a bridging network controlling a pulse counter or recorder and including a capacitance in series with such pulse-counter or recorder and connected with a charge retarding circuit or circuit element; such network being connected across one or more lines to be monitored to permit automatic evaluation or registration of pulse messages such as dialing pulses.

A further object of the invention is a monitoring network adapted selectively to be connected to a number of switching networks, and including change receiving capacitances and charge retarding impedances such as resistance, inductances, or combinations thereof.

A further specific object of the invention is a number of switching networks adapted to be connected to a corresponding number of lines to be monitored, and a common monitoring network to be connected to each of these switching networks to permit monitoring while at the same time permitting the lines to be monitored to be held in different conditions such as short-circuited or at stand-by.

Still another object of the invention is a monitoring network permitting practically simultaneous observation of several lines while at the same time selectively permitting two way conversations over one or between several lines, and involving two or more parties.

These and other objects of the invention will be more fully apparent from the drawings annexed herewith in which FIGURE 1 shows a pulse counter involving certain aspects of the invention.

FIGURE 2 shows a diagram permitting monitoring of several lines.

FIGURE 3 shows diagrammatically a line reversal polarity switch facilitating monitoring and FIGURE 4 shows a monitoring equipment permitting two-way conversations.

FIGURE 5 shows a modification of FIGURE 1 and FIGURE 6 an automatic pulse counter.

FIGURE 7 represents a modification of FIGURE 6.

FIGURE 1 shows a circuit diagram permitting pulse counting in accordance with the invention.

Figure 4:
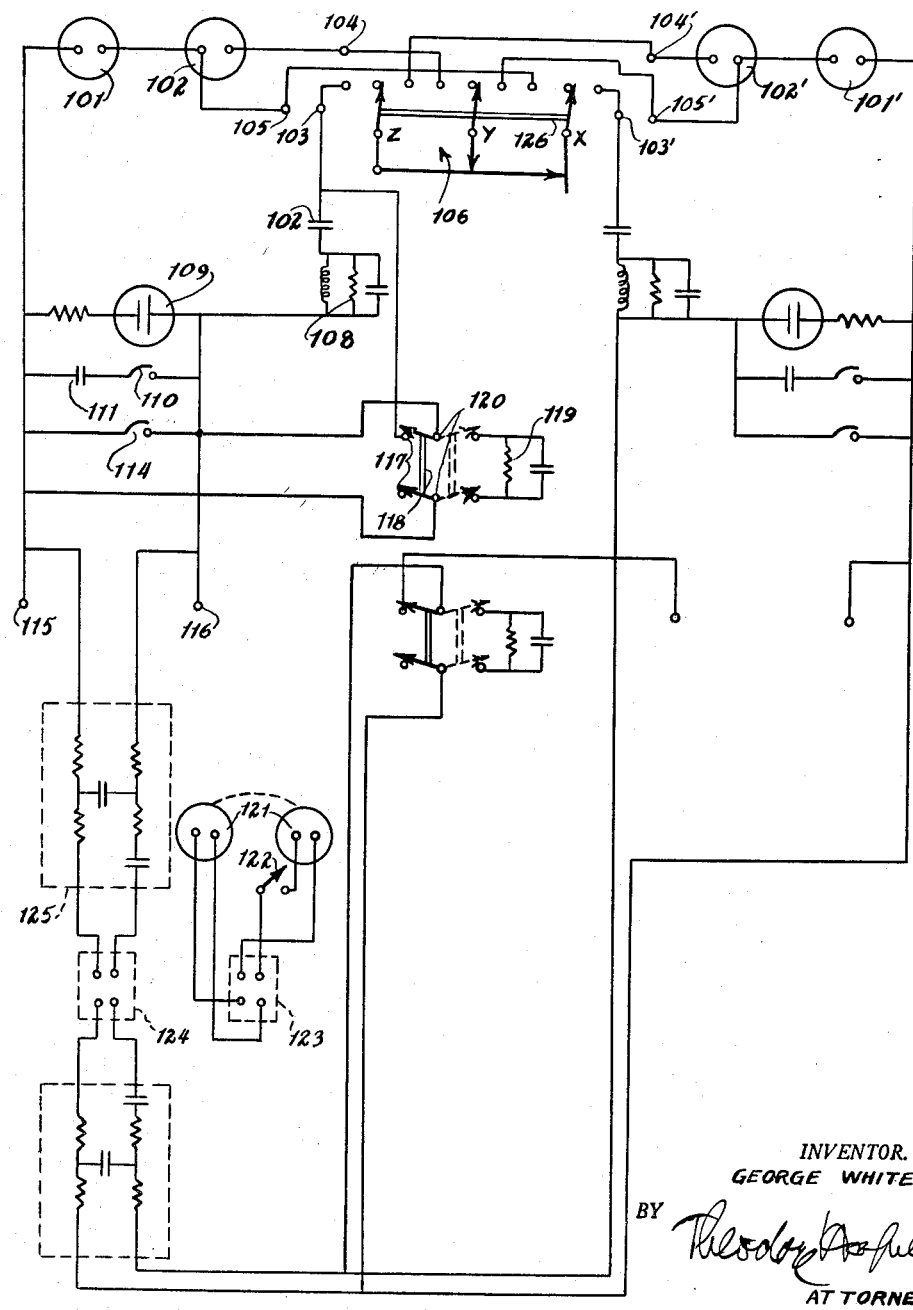

In FIGURE 1, lines 1 and 2 represent the two input leads of the impulse counter over which pulses are sent to a 257 mfd. condenser 3 to the winding 4 of the polarized relay 5. When winding 4 is energized by a pulse, contacts 6 are momentarily (for the duration of one pulse) closed. This in turn energizes the winding 7 of slave relay 8 momentarily. When winding 7 of the slave relay 8 energizes, its contacts 9 close momentarily. This set of contacts performs two operations simultaneously.

Firstly, it allows pulses to be fed through line 10, contact arm 11 to the "A" branch of counter 12.

Secondly, when contacts 9 of slave relay 8 close they also energize coil 13 of slow release relay 14. Contacts 15 of slow release relay 14 close and will remain closed for the duration of the total number of pulses to be counted by the selected counter element A to J of counter 12.

When the pulses directed to a counter element A to J are completed, slow release relay contacts 14 will open. This in turn causes the contact arm 11 of stepping switch 16 to select the next counter element B.

Power is derived from rectified A.C. or D.C. or a battery, schematically indicated at 17, 18. The voltage necessary to operate the circuit depends on the resistance of the coil windings used in each relay and in the stepping switch.

Part 19 represents an open circuit jack permitting a direct corcuit connection to the pulse line over the line balancing resistors 22, 23 mentioned below.

Part 20 represents a similar type jack in series with a .5 mfd. condenser 21 inserted in one leg of the line to form a high impedance circuit. Jack 20 can be used to connect to a tape recorder, head phones, provided with a click suppressor circuit as will be explained further below.

250-ohm resistors 22, 23 are placed in series with each leg of the line connecting to open circuit jacks 19, 20. This will prevent loading or mismatch due to improper matching caused by the device connected across jacks 19, 20.

The circuit of FIGURE 1 functions as follows:

Condenser 3 is a blocking condenser used in series with one leg of relay 5 in order to prevent the D.C. voltage from entering or energizing winding 4. Relay 5 used in this type circuit is a highly sensitive polarized relay.

The resistance of the winding is so selected that when the coil is pulse-energized, the rapid field build-up and collapse (when the pulse is completed) will not cause holdover or so called slow release.

Contacts 6 are only used as an automatic switch which will switch on and off the B supply to the slave relay 8. The contacts will follow whatever pulse rate is fed into the line input circuit.

Condenser and resistor combination 24 is used across the contacts to absorb the contact—make and break peaking voltage.

Slave relay 8 is designed to further the function of the circuit. Upon receiving the pulse of B voltage from the contacts 6 of polarized relay 5, slave relay 8 will follow the pulse rate of polarized relay contacts 6.

Winding 7 of slave relay 8 is of high resistance, about 10,000 ohms. This minimizes the current drawn through contacts 6 of relay 5.

Contacts 9 of slave relay 8 are rated at approximately 3–4 amps; because of inductive loading. The contacts are quick acting and will follow the pulsed B voltage fed to winding 7 which in turn controls contacts 9 of relay 8.

Suppressor circuit 25 is used to quench the contact arc and is similar to that for contacts 6 at 24.

Relay 14 represents the time control or slow release relay 14. The resistance of winding 13, the construction of the copper heel are so selected as to produce the proper time lag in terms of milli-seconds.

Suppressor circuit 26 is similar to that used at 24.

Contacts 15 in this circuit are used to control the inductive load of the master selector stepping switch coil 27.

The operation of contacts 9 of relay 8 will close contacts 15 of slow release relay 14. This in turn energizes the master stepping switch winding 27 which selects the counting switches A to J.

When contacts 15 close, the B voltage will energize coil 27 of switch 16.

Coil 27 remains energized until the last pulse passes at which time contacts 15 open and in turn remove the B plus from relay coil 27.

The movable arm 11 of eleven point stepping switch 16 sliding over contacts 11' will not move until contacts 15 are open. Arm 11, as soon as stopped over any of contacts 11', completes the counting circuit winding which will actuate the corresponding counting winding A to J of counter 12.

Each unit "A" to "J" represents an eleven point stepping switch.

Each of stepping switches "A" to "J" includes a numbered drum (not shown) mounted in otherwise well known manner on its rotating shaft which pivots with the wiper arm.

Each of these switches is of three deck eleven contact type, of which only one of the three decks are used. This provides enough space for the numbered drum to be mounted on the shaft. As each of the stepping switches "A" to "J" follows the number of impulses sent to it, the numbered drum will step simultaneously and come to rest on the proper number which will be the sum of the impulses sent to the selected stepping switch.

FIGURE 2 represents a master multi-line monitoring selector in accordance with the invention.

In FIGURE 2 lines 31 through 34 represent four individual pairs of lines which will connect across a telephone line carrying a conversation, dial impulse, ringing voltage etc. to be investigated in and with the aid of this invention.

Indicating systems including neon lamps 35 through 38 will flash when the 105 volts A.C. ringing pulse voltage is applied.

Open circuit jacks 39 through 43 are connected in parallel with each line input 31 through 34. This permits a single line to be jacked into at any time and by so doing to form two separate lines but having a common input.

Open circuit jacks 43 through 46 have the same basic features as jacks 47 through 50 with the exception of a .25 mfd. condenser 47–50 added in series with one leg of each jack 39–42. This condenser is used to prevent direct loading of line or impedance mismatch, also to prevent D.C. from entering the line or apparatus to be used.

Ganged contact arms 51–37 of a three position lever switch, serve to connect the following elements.

A 17-ohm resistor 59 through 62 is used to throw a momentary short circuit across lines 31 through 34. This short circuit causes a line loss or amplitude drop but the loss will be gradual, and in so doing, will cause the voice on the line to undergo a slow fade only which therefore will not be especially noticeable and simply subject the speaking party to repeat what it said.

A .057 mfd. condenser 63 through 66 is used in conjunction with resistor 50 through 62 to absorb the click when resistor 59 through 62 is placed across the line. Also, when such condenser is used, it aids in causing fading when used together with resistor 59 through 62.

Parts 67 through 70 indicated the resistance component of an inductance unit 71 through 74. Resistance component 67 through 70 across lines 31 through 34 serves to produce a holding circuit. Line holding is used when one phone is used to talk over two phone lines, and, while the first party is talking, another line rings. At this point, a holding bridge is placed across the first line while the other line is being answered.

Thus, for example, unit 75 will represent a three position lever switch movable upward and downward and in direction of arrows 75', 75" with a set of contacts common to the line input 85 that will enable the user to select any one of the circuits across its stationary switch positions. In the first or top position arms 51, 52 are connected over capacity shunted resistor 59. In the second or medium positions arms 51, 52 are connected over inductance 72 and in the third or bottom position arms 51, 52 are directly connected over switch 81 to line terminals 89.

Stationary double pole position arms contacts 76 through 79 being to a four position rotary switch, each one of four sets of double pole stationary contacts being placed across one of the four lines.

The double pole four position rotary switch is schematically indicated at 80. At 81 there are indicated the two wipers of rotary switch 80, movable from one of contact pairs 76—78 to another and in direction of arrows 81', 81".

A double pole single throw switch is schematically indicated at 82 having make or break contact arms. This switch will short circuit return lines 83, 84. When this action takes place, there will be a direct connection to the main line, or if left in the open position, it will allow all parts to function.

Lines 83, 84 comprise each a 250 ohm resistor which is placed in series with each leg of the output line to prevent impedance mismatch or line loading; a click suppressing condenser of .23 mfd. is used to suppress the click when the switch is opened and closed; the inductance unit together with its own internal resistance is used in conjunction with resistor and condenser to set up a click reduction reactor circuit.

The output terminals of this unit are indicated at 85.

The following operations can be performed at this point:

Any one of the four input lines can be monitored one at a time without line loading.

With the aid of a test phone it is possible to dial a subscriber for test purposes on any one of the four lines 31–34 available.

Any conversation or dialing can be recorded.

With the aid of the proper equipment one can talk to or with two persons at once or if necessary hold a two way conversation with all three persons simultaneously.

The circuit of FIGURE 2 operates as follows:

It covers four separate telephone lines 31 through 34 in one compact unit. Each one of the four lines can be connected selectively to be monitored.

Circuits 35 through 42 represent the indicating system used to notify the monitoring operator when a line is receiving its ringing voltage.

Jacks 43 through 46 connected directly across lines 31 through 34 enable the user by jacking into these points to perform the following operations:

Multiple conversation, direct line recording, dial recording, dialing, monitoring, connecting a hi-impedance ringing device etc.

Switch 75 is used in connection with contacts 51 through 58 and is a rotary switch with three positions. The positions used are as follows:

Center position or neutral: direct to each of lines 31–34.

Forward position or short: this position is used to throw a momentary short (fade) on the line being monitored; it will oblige the user to have to repeat his or her number called.

Rear position or line hold: this is used when an incoming call is to be held while the operator answers another incoming call. The call thus held will remain held until the operator returns switch to neutral.

Switch 80 is a double pole four position rotary switch. This switch enables the user to monitor or work on any one of the four lines 31 through 34—one at a time only, unless the special dual line compensator (automatic line polarity reversal switch such as shown in FIGURE 3) is used.

Switch 82 used in this circuit is a shunt or compensating switch which allows the user to preload the line or short out the components used in preloading the line.

With the aid of terminals 85 or corresponding jacks the operator is able to monitor or dial out, record, dial-record, etc. He can only use one line at a time of the four existing lines. When it is desired to speak or monitor more than one line at a time, it is necessary to use the "master multi-line bridge," or the "automatic line reversal polarity switch," such as indicated in FIGURES 4 and 3 respectively.

When using output circuit jacks 85, it might be necessary to use shunt control switch 82. The primary use of this switch is as follows:

When entering upon a line where there is apt to be a conversation it would be necessary to use the shunt switch 124 in the "on" position (switch open). By doing this, the user of the monitoring equipment cannot be detected. Also, this shunt will enable the user to use a wide variety of impedances without affecting the line. When shunt switch 82 is in the "off" position the component parts in the compensating reactor circuit are shorted out.

FIGURE 3 shows an automatic line reversal polarity switch facilitating monitory.

FIGURE 3, 91 indicates one main line including positive and negative leads.

Double pole double throw switch contacts 92 are part of the polarized relay armature shown schematically with two windings 93, 94 wound on a single core. When both windings are energized with the same voltage and of the same polarity, they are neutralized, and in this position the armature will remain up.

Output is indicated at 95 also including positive and negative leads. If the polarity of line 95 should be reversed, it would actuate the polarized relay switch contacts 92.

This same above action also holds true for line 91.

In other words, if for any reason line 91 should change its polarity, and line 95 would remain the same, switch 92 would operate and polarity would be reversed on line 91. This action would now give line 91 the same polarity as line 95.

Switch 92—94 is primarily—though not exclusively—designed for, and to be used with the multi-line monitoring selector in FIGURE 2. When used with the latter type unit, the operator is enabled to perform the following operations:

Line 91 is plugged into a phone line which contains one positive and one negative lead, making one line pair. Now, line 95 including an automatic switch is plugged into another phone line containing a pair or a so-called polarized line. One is now able to connect the party on the first incoming line on the selector with any of the other open lines existing. If there is a party on the second line, the parties will now be able to carry on a conversation between them while the monitoring operator will control both lines completely. At any time while this conversation is carried on, the operator is able to talk to the two parties on the line. He also is in a position to hold a private conversation with any one of the parties on any existing line while holding the other, or vice versa. When this circuit is completed and the polarity is automatically adjusted so no line has a mismatch or reversed polarity, the monitoring operator is ready to operate the above described equipment.

In FIGURE 4 part 101, 101' diagrammatically represents a receiver or receivers used to monitor a conversation or when properly wired used in conjunction with a transmitter or transmitters diagrammatically indicated at 102, 102'.

Transmitter or transmitters 102, 102', are only used when it is necessary to carry on a two way conversation.

Contacts 103, 104, 105 are elements of a dial selection switch contact assembly placed into the circuit.

Block 106 represents a dial unit with an internal contact arrangement including contacts X, Y, Z of switch 106 hold a short on transmitter 102.

Part 108 represents a hash line filter including in parallel connection a .275 millihenries inductance, a .5 ohm resistor and a .028 mfd. condenser. This parallel circuit 108 is used when a two way conversation is to be carried on.

Neon lamp 109 serves to notify the operator of the equipment that a call is on the line.

Jack 110 represents a standard open circuit jack with a 111 of .255 mfd. inserted in series with one leg of this jack and then connected between the lines 112, 113.

Jack 114 also is an open circuit jack connected directly across lines 112, 113.

Terminals 115 and 116 represent the input terminals to the unit.

At these points the telephone lines under investigation are connected to the monitoring contact elements 117 switches 118. When contacts 117 are in open position, cendenser 107 of .275 mfd. will be used in the monitor circuit. When switch contacts 117 are closed, condenser 107 is shorted; this now allows the dial circuit 106 or the transmitter circuit to operate.

Short circuit 119 including a 17 ohm resistor and a .25 mfd. condenser in parallel with it, which when applied, causes the line under investigation to fade.

Part 118 represents a three circuit switch unit with an outer spring return in one position. The center position is left open and the forward position is used for talking or dialing.

A set 121 of ear phones is used to monitor two lines at once, with a suppressor circuit and a switch 122 to shut off one phone. The resistance of the phones is selected (i.e. at 50 ohms) to give the best impedance match to the line suppressor and filter circuit.

Four prong male jack 123 cooperating with receptacle 124 will enable the user to take the phones out of the circuit at will.

A line balancing compensating network and also a noise reduction filter plus click quenching circuit is shown incorporated into one unit 125.

Switch 126 serves to connect X, Y, Z of dialing device 106 to terminals 103, 104, 105 as apparent from FIGURE 4 and also to terminals 103', 104', 105'. This allows the dial to be used in either one of the circuits, or neutral. This enables the operator to use the dial and then switch it out so that a line can be monitored, used for conversation, etc.

The above unit should be used with the multi line selector of FIGURE 2 if it is found necessary to hold a line or speak to several parties at once, or any combination thereof.

Each unit as explained in the preceding sections can be used per se or in combination with other units disclosed or undisclosed, without exceeding the scope of this invention.

The following modifications, among others, may be applied to the invention without exceeding its scope:

The lines to be monitored can be shunted by a suitable transformer balancing the lines in its primary circuit so as to retard the connecting charge of the condenser and reduce noise to a minimum.

Blocking condensers can be replaced by using series resistors of the order of at least 50,000 ohms or vacuum tubes, transistors or crystal diodes.

Polarized, slave and slow-release relays can be replaced by a suitable vacuum tube or flip-flop circuit or by corresponding transmitter or crystal diode circuits.

The pulse counter can be replaced by an electro-mechanical printer including a preferably spring or battery driven tape transport mechanism.

The indicating lamps can be replaced by high impedance ringers or similar circuits.

Jacks can be replaced by any type of switch or relay. Resistors can be substituted by an inductance with the same value of internal resistance.

Inductances can be substituted by using a combination of non-inductive resistors in combination with an inductance, or reactance. Switches such as 75, 82 can be substituted by single position switches, relays or other switches. Rotary switches such as shown at 80, 82, or 126 could be of the type shown at 75.

The suppression filter combination 83 and 84 can be substituted by suitable vacuum tube circuits, inductance units or any combination of units designed to accomplish a similar purpose.

Switch 92, 94, 95 can be replaced by suitable vacuum tube, transistor, or crystal diode circuit.

Receiver 101 can be replaced with a crystal head set, or transistor, or suitable vacuum tube circuit.

Transmitter 102 can be a carbon type, dynamic microphone or crystal or condenser microphone on any other device converting mechanical energy into electric energy.

Dial switch 106 can be substituted by any other pulse, selecting mechanism or a suitable electronic or mechanical circuit.

Circuit 108 can be substituted by an inductive resistive or reactive type circuit or, if desired, the circuit can be completely eliminated.

Condenser 111 can be substituted by a suitable matching transformer or electric circuit.

Filters and click-quenching suppressor circuit such as shown at 125 can be substituted by resistive bridging circuit, reactive filter network or an electronic bridging reactor circuit.

FIGURE 5 represents a modification of FIGURE 1 in which a relay of the type shown in FIGURE 1 at 5 and diagramatically indicated in FIGURE 5 at 127 operates contacts 128 to energize a pair of 2000 ohm drive coils 129, 130 of a pulse recorder or pulse scribe schematically indicated at 131 and operating upon 132 in otherwise well known manner.

A pulse recorder in form of pen register 131 is only one of the many printing devices that can be used with a circuit such as shown in FIGURE 5. In this case pen 132 pushes against a wheel (not shown) which has an ink roller. The pen 137 itself has a V cut in it. The wheel is of rounded V shape. When pen 132 pushes the paper against the wheel, it will print a dot as the speed is relatively great (28 pulses per second). If the speed is slow, the pen will print a dash as it will be held longer against the wheel.

In the automatic pulse counter of FIGURE 6, parts 134, 135 represent input terminals which connect to a pair of leads with clips (not shown) to permit monitoring operator to connect these input terminals to a subscriber's telephone line.

Network 136, 137, 138 operates on one polarity only. It can be adjusted to operate on a (+) or (—) polarity, as set by crystal diode 137. Variable resistor 136 is used for two purposes, one, to limit the current into the diode, two, to limit the current entering the relay coil 138 which is a supersensitive relay with a high resistance coil and a current consumption of approximately 10 microamperes. Relay contacts 139 will not operate when a reverse polarity is placed at terminals 184, 185.

Parts 140, 141, 142, 143 and 144 of the circuit, operate as follows:

140 is the battery supply to contacts 139 of relay 138. This applies the required voltage to the polarity control relay 142 which permits it to operate. 141 is a current limiting resistor and a load in series with relay 142; its relay coil being a resistance of only about 5,000 ohms. 143 is an electrolytic condenser with a high capacity of the order of 60 to 90 microfarads, with a working voltage of 250 volts. Condenser 143 is used in this circuit for two purposes, firstly, for causing the relay to slowly release, and, secondly, to permit contacts 144 to remain closed when dialing takes place. Contacts 144 of relay 142 will operate under control of polarized circuit relay 138 and its contacts 139.

Parts 145 to 150 represent a network which when operated by push button 148 will, if the polarity is wrong, light neon lamp 150. This will eliminate the need for a meter which is ordinarily used to indicate polarity in circuitry of this type. The unit when operated draws so little current that the battery will last for two years. Also, when push button switch 148 is depressed and neon lamp 150 is operated, the line to which this network is connected is not disturbed in any manner, at least not by any audible noise due to the presence of this device on the subscriber's line.

Parts 152 to 161 represent a device for monitoring the dialed information of a subscriber's line in such a manner as not to produce any interference or audible noise with such subscriber when dialing, talking, or listening.

This dial recording and indicating device is connectable to a subscriber's telephone line and will permit the dialed information produced in such subscriber's line to be recorded. Such device can be made portable and operable with a repetition frequency of 120 pulses per second as a maximum.

This unit can be made in two types. The first serves to indicate each of the numbers dialed on a drum mounted on a single special stepping switch with shaft type mounting.

Since the maximum number of digits appearing in a telephone number today does not exceed ten, ten number drums are used, attached, respectively, to each of the ten special stepping switches as shown at 163, FIG. 6. These ten separate units 163 are wired into a single control stepping switch 159 under control of its contacts 167. Relays 157 and 165 are similarly connected. In this way the unit will operate a pulse printing register which will produce a dot on a paper tape corresponding to the number dialed by the subscriber.

The circuit for this is well known per se and therefore not shown; it requires only a resistor 152, condenser 153, magnet coil 154 and a slave relay 155 having contacts 156. Relay 155 operates the coils of the printing register. The simplicity of this circuit makes for a compact light weight dial recording unit which will operate for 6 months on its own battery supply. It should readily be seen from the explanation above, that the units herein described are far ahead in design and function, than any other now in use.

A more detailed description of the circuit of FIGURE 6 and its operation follows:

As soon as terminals input 134, 135 are connected to a subscriber's line, sensing circuit 136, 137, 138 will test the polarity. If this polarity is correct, it will not permit polarity control relay 138 to 142 to operate; this in turn will leave relay 138 to 142 in its normal position, and its output is then fed to the input of the specially sensitive polarized relay 154 for reproduction of the dialed number as it will follow the pulse produced by the dial of subscriber's phone.

Circuit 145 to 150 represents a manually operated polarity indicator which is used by the operator of this equipment to identify the proper polarity. 145 and 149 are series resistors. 146 is a crystal diode with a high back resistance. 147 is a battery with a voltage of about 50 volts. 150 is a small neon lamp. 148 is a momentary switch with normally open contacts which are pushed to close.

Contacts 139 of relay 138 close when relay 138 operates on a reverse polarity. This will send 135 volts through relay 142 and holding condenser 143, back through limiting current resistor 141 to the minus or return of the battery. When contacts 139 of relay 138 through variable resistor 136 are operated by being applied to a line, and if a dialing action takes place, relay 138 will tend to follow these pulses.

In order to avoid a pulsing of contacts of relay 142, condenser 143 is shunted across this relay to produce a slow release action. This action improves the operation of contacts 148 of relay 142.

This polarity unit is needed when operating any dial recording device. If the wrong polarity is ever used, the dialled information will contain one more pulse on the tape for each number that is dialed. If the polarity is correct the dialing information will also be correct.

Series resistors 152, 152' are used in series with capacitor 153 and the internal resistance and the self inductance of the polarized relay 154. This combination aids in suppressing any audible click and preventing it from being sent back to the line when entering the line to be monitored.

Blocking condenser 153 prevents the entry of D.C. voltage from the line, but will permit the audio and dial pulse to pass through. The value of the condenser is critical because too little capacity will cause the polarized relay not to operate on high speed pulses, and too much capacity will cause a click to be heard on the line when entering. The latter, of course, could be prevented in accordance with the teaching of my parent application.

Relay 157 and its contacts 158 is a slave unit, fast acting at the exact pulse speed as the control input relay 154 and its contacts 154'.

Slave relay contacts 154' are made to handle a current load of 5 ampere; when these contacts close they close two separate circuits; one is the slow release relay 157 which energizes the motor magnet of stepping switch 159. The motor magnet will remain energized for the duration of the series of pulses being received, and then when the pulses cease, slow-release relay 157 will open and the motor magnet of 159 will step one position. The other circuit will send the pulses from contacts 154' to the control selector arm of stepping selector switch 159 and its contacts 159'.

As each line is selected a series of pulses are permitted to pass to one of the ten solenoids 163 as selected by master selector stepping switch 159. Each series of pulses are fed to a stepping switch 163, each having a drum mounted on its shaft and the pulses will cause this switch to select the number, each stepping switch to follow the number of pulses fed to it, and the drum will be turned to the number stamped on its face. Since each drum is mounted on the shaft of a stepping switch it is necessary to use a special switch and a drum with a numbered sequence. Blank will show at the drum windows when these drums are in the home position, but when operated each of the ten drums will have a number on its face indicating the dialed number.

An important feature of this circuit is a special pulse removing circuit.

Stepping switch 159 has a total of eleven level contacts. 159', the first, represents home; the second operates when the phone is picked up from its cradle. Relay 157 then locks and holds 159 operated until it has received all of its pulses. Then 157 will open which will then permit 159 to select the next contact to which its pulses are to be sent.

The removal of the first pulse is important because it will prevent the stepping switch from starting on the wrong selector and the information to be fed to the wrong selector drum. If it were used it would require special switches having twelve contacts on the selector level. The invention permits the use of a standard level of eleven contacts.

A special set of contacts 162 is under control of a cam 162' with a protruding hump. When the stepping switch is sent home by the closing of manually operated switch 166, this hump will close relay 165 with its contacts 164. This return-to-home circuit will automatically self-interrupt all the motor magnets of the stepping switches and when they reach the point on the revolving cam, it will stop them at the home position. This action will cause all numbered drums to show a blank position in their respective viewing windows.

FIGURE 7 represents an automatic dial recording machine developed for law enforcement agencies that do not want to put a man on the job or plant or one man for each machine or dial recorder. The unit herein described is not only automatic but also portable.

It has a built-in special storage system for the dialed information which is fed to it. When the number is completed the control relay 168 and its contacts 169 will actuate the solenoid 170 of the master printer (not shown) but of well known construction and in turn it will depress the printing tab or bar which will cause this mechanical printing device to print all digits sent to it via ten digit control solenoids which are not shown but all of the same type, which when selected to operate by this system, punch in a tab representing the number dialed.

This mechanical unit in turn will store all information fed to it and when the print tab is actuated by relay 168, contacts 169 will close energizing solenoid 170 which will depress the print tab or bar. This will print all previous information stored by the special mechanical adding machine system on a paper tape, in digit form such as the number 34556611.

This unit will also print the time, hour, minutes, AM or PM, date, day, month and year, when the phone was removed from cradle for the start of a conversation, that is, after the subscriber lifts the telephone hand set from the cradle.

At the same time, another control circuit will cause a recording machine to operate, and still another control circuit will permit this unit to print the complete dialed number in digit form.

When the conversation is completed it will cause the time and date stamp to apply its information to the paper tape again.

This will result in a complete automatic record on tape of the complete dial, speech, time, date information as to when the conversation started and a record of when it ceased.

It can be seen from the explanation of this unit that it is an important contribution to law enforcement agencies. It saves man power, in the sense that an installation will not have to be watched by a person operating this equipment. It will also reduce human interference to a minimum and therefore capable of serving as reliable scientific tool for gathering evidence.

A more detailed description of the circuit of FIG. 7 and its operations follows:

*Input*

Input terminals 171, 172 are shunted a 67½ volt battery for polarity indicator 173, a crystal diode with a high back resistance 174, and a small neon lamp 175 as well as series current limiting resistors 176, 177 and momentary push-to-close circuit contacts 178. A .05 mfd. blocking condenser 179 is in series with the coil of relay 180 to block out the D.C. from the line. Relay 180 is specially designed polarized with an internal shunt winding to prevent hold-over due to the extremely fast action of this relay. It will respond to a pulse input speed of 155 pulses per second. This far exceeds normal telephone work as ordinarily the fastest telephone dial produces only 20 to 23 pulses per second.

Relay contacts 181 operate relay 182 having contacts 183. Contacts 183 relay 184 which is of very high speed transfer type sending its pulses from its contacts 185, 186. Contacts 185 transfer the pulses received from 184 and sent from 183, 182, 181, 180.

Relay 187 receives its pulses from contacts 185 of relay 184.

Relay 188 operates from contacts 186 of relay 184.

Contacts 189 and 190 of relay 188 operate.

Contacts 189 open, removing the B+ from the main contacts 191.

Contacts 190 close operating relay 192 which operates. Contacts 191 close and 193 open.

Relay 187 receives its pulses from contacts 185 of relay 184. Rotary stepping arm 194 when pulsed, via operation of 187 will select one of the contacts 1 to 10 of 195.

Just as soon as the motor magnet 187 receives its first pulse it steps off normal and closes circuit 196 which, however, does not operate until relay 188 opens which in turn opens contact 190. Relay 192 now opens its back contact 193 which connects to 197 and in turn sends the contact arm 194 of 187 to its home position.

Contact arm 194 when operated will select one of the contacts 195. When it stops on such contact, relay 188 opens, contacts 189 close and contacts 190 open.

Relay 192 opens; contacts 193 close and apply ground to homing circuit 197. Contacts 191 have a fractional delay. This permits contacts 191 to apply B+ to the contact arm 194 which is in turn applied to contacts 195 as selected by the rotary arm. Due to the fractional delay, contacts 191 will then immediately open the B+ line.

Solenoid 198 is operated when selected by the rotary arm and is operated by controlling B+ relays. When it operates it pushes a numbered tab. Each solenoid rests over a tab number. The numbers are numbered from one to ten and they are pushed by the solenoids as they are selected, under control of the input pulse sending relay and the slave repeat units.

When the phone is taken from the cradle this circuit operates as follows:

Super sensitive relay 182 operates on a current of about 3 microamperes. The exact current is adjustable by the use of the 5 megohm series potentiometer 20. Contacts 183 close and thereby close the contacts 201, 202 of slave relay 203. Contacts 201 and 202 operate, but before one continues with the pulse which exists on the line when the telephone is first removed from the cradle.

Polarized relay 180 operates once and transfers this pulse to its contacts 181, which operate relay 182. Contacts 183 transfer its information to the back contacts 204 of relay 205. This pulse closes relay 206 which applies the ground to the time and date stamp solenoid 207, causing the time stamp to print its information on a paper tape then through the paper spacing mechanism it will up-space by eight spaces. This leaves room enough for the digit printing of the dialed number.

Relay contacts 183 will close, operating immediately behind the first pulse which causes the time stamp to print. 183 will then operate relay 203 and contacts 201 and 202. Contacts 201 close and in turn will close the circuit for relay 205. Relay 205 is so connected with its network as to cause it to close slowly when contacts 201 operate.

Relay 205 operates and connects contacts 183 to contacts 185. As relay 184 is pulsed by the operation of relays 180 and 182, they cause relay 184 to follow these pulses.

When contacts 185 close on each pulse, motor magnet 187 is caused to be placed at ground through contacts 183 as they pulse or repeat what relays 180 and 182 will send. As contacts 185 are pulsed, 187 operates. This causes rotary arm 194 to select a contact from 1 to 10 in accordance with the received pulse information.

Contacts 202 close and operate slow release relay 208. Its contacts 209 close, sending AC line voltage to start the recording machine. When the telephone receiver is put back on the cradle, this breaks the circuit and another pulse is sent to the unit. This operates relays in the following sequence:

Input 180 receives the pulse and sends it over 181, 182 and 183 to back contact 204 because contacts 188 open just after one hangs up the receiver. 206 operates and contacts 210 close causing time and date stamp to print its information via solenoid 207.

*Dial pulse printing*

Just as soon as stepping switch 187 is pulse operated, the off normal springs will close. This will cause contacts 196 to operate which in turn operate relay 211 which is a special vibrating reed relay with a second section built for slow release. When the stepping switch operates it returns to home after each selection of solenoids 198. This does not permit the relay 211 to open for more than about 1 to 3 seconds. Soon after another number is dialed. The vibrating reed then starts to swing, making and breaking its contacts, until the stepping switch 187 returns home and opens its off normal springs 196.

Relay 211 opens; contacts 212 open after a few swings of the reed. Relay 213 will then open, contact 204 opens, 215 closes and 216 opens; relays 168 and 169 open.

Now when a dialed number is completed, a time delay waiting period of 15 seconds is caused to elapse, after which the circuit operates to print the digits stored by the mechanical storage system which is of the type of an adding machine.

This is made to occur in the following manner:

Upon receiving the last digit as fed to stepping switch 187, its off normal springs will remain in the home position as the digital impulses have ceased. Meanwhile the vibrating reed is swinging, making and breaking contacts 212, and holding relay 213 closed; it will remain closed as long as 212 swings back and forth. When swinging ceases, contacts 214 will open. 215 will close. Contact 216 will open. Slow release relay 168 will hold its contacts closed. Contacts 169 will also remain closed.

Now the stepping switch will return home which in turn will cause its off normal springs to return to normal. Thus its contacts 196 will complete the B+ line for the printing solenoid. The holding control relay will permit the solenoid to remain energized for about ¾ of a second. Then 60 mfd. condenser 217 across relay 168 will be discharged and will cause its contacts 169 to open and thus remove the B+ voltage.

It is understood that the mechanism used to store and print the information on the tape is well known per se and therefore not an object of this invention.

I claim:

1. In combination, a pair of input terminals adapted to be connected to at least one audio-communication line which is connected to the subscriber line of a dial telephone, recording means, means for storing the number dialed preparatory to recording including relatively fast, biased polarized relay means having a very large impedance connected through a blocking condenser across the communication line, stepping relay means connected to said input terminals for operating said storing means in accordance with the dial pulses received from said audio-communication line, timing means under control of said relay means defining a predetermined timing interval substantially exceeding a normal dial pulse interval and means under control of said timing means for energizing said recording means to record the dial pulses under control of said storing means; said energizing means including delayed relay means operating under control of said fast relay means to control, after a time interval of more than normal dial pulse interval length and less than a predetermined number of seconds, several successive relay operations including said stepping relay means controlling the storing means.

2. Combination according to claim 1 comprising time and date recording means, and wherein said time-delayed relay means control is operative prior to said stepping operation, said time-date recording means being operative after the operation of said stepping relay means.

3. Combination according to claim 1 comprising high impedance non-polarized relay means controlled by said time delayed relay means for preparing said recording means.

References Cited in the file of this patent

UNITED STATES PATENTS

| | | |
|---|---|---|
| 1,795,350 | Stehlik | Mar. 10, 1931 |
| 2,352,492 | Ostline | June 27, 1944 |
| 2,399,682 | Kucera | May 7, 1946 |
| 2,457,046 | Kucera | Dec. 21, 1948 |
| 2,709,722 | Rosene | May 31, 1955 |
| 2,756,288 | White | July 24, 1956 |